United States Patent
Moulinas et al.

(10) Patent No.: US 12,492,843 B2
(45) Date of Patent: Dec. 9, 2025

(54) HEATING BODY OF AN ELECTRIC RADIATOR

(71) Applicant: VALEO SYSTEMES THERMIQUES, Le Mesnil-Saint-Denis (FR)

(72) Inventors: Frédéric Moulinas, Le Mesnil-Saint-Denis (FR); Serif Karaaslan, Le Mesnil-Saint-Denis (FR); Jonathan Lefloch, Le Mesnil Saint-Denis (FR); Yann Couapel, Le Mesnil Saint-Denis (FR); Thomas Brun, Le Mesnil-Saint-Denis (FR); Stefan Frenzel, Bad Rodach (DE); Laurent Tellier, Le Mesnil-Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 0 days.

(21) Appl. No.: 18/857,137

(22) PCT Filed: Apr. 13, 2023

(86) PCT No.: PCT/EP2023/059719
§ 371 (c)(1),
(2) Date: Oct. 15, 2024

(87) PCT Pub. No.: WO2023/198852
PCT Pub. Date: Oct. 19, 2023

(65) Prior Publication Data
US 2025/0116424 A1    Apr. 10, 2025

(30) Foreign Application Priority Data

Apr. 15, 2022 (FR) ...................... 2203575

(51) Int. Cl.
*F24H 3/04* (2022.01)
*B60H 1/22* (2006.01)
*H05B 3/44* (2006.01)

(52) U.S. Cl.
CPC ......... *F24H 3/0441* (2013.01); *B60H 1/2218* (2013.01); *B60H 1/2225* (2013.01);
(Continued)

(58) Field of Classification Search
CPC ... F24H 3/0441; B60H 1/2218; B60H 1/2225; H05B 3/44; H05B 2203/017; H05B 2203/023
(Continued)

(56) References Cited

U.S. PATENT DOCUMENTS 4,693,307 A * 9/1987 Scarselletta ............. F28F 1/128
165/152
4,998,580 A * 3/1991 Guntly ................... F25B 39/04
165/173

(Continued)

FOREIGN PATENT DOCUMENTS

EP    1340637 B1    8/2009
EP    1687572 B1    10/2014

OTHER PUBLICATIONS

International Search Report Issued in Corresponding PCT Application No. PCT/EP2023/059719, dated Jul. 18, 2023 (6 Pages with English Translation).

(Continued)

*Primary Examiner* — Eric S Stapleton
(74) *Attorney, Agent, or Firm* — Osha Bergman Watanabe & Burton LLP

(57) ABSTRACT

Heating body (2) of an electric radiator (1) comprising a plurality of heating elements (4) having a first longitudinal end (6) and an opposite, second longitudinal end (8), the
(Continued)

heating body (2) comprising a first connection device (14) connected to at least one connection member (10) extending to the first longitudinal end (6) of the at least one of the heating elements (4) and a second connection device (16) connected to at least one connection member (10) extending to the second longitudinal end (8) of the at least one of the heating elements (4), characterized in that an electrical connection member (18), electrically connecting the first connection device to the second connection device, is disposed in a connection tube (20) which extends parallel to the at least one of the heating elements.

17 Claims, 5 Drawing Sheets

(52) U.S. Cl.
CPC ......... H05B 3/44 (2013.01); *H05B 2203/017* (2013.01); *H05B 2203/023* (2013.01)

(58) Field of Classification Search
USPC ........ 392/360; 219/202, 504, 530, 537, 540, 219/548, 553
See application file for complete search history.

(56) References Cited

U.S. PATENT DOCUMENTS

| | | | | |
|---|---|---|---|---|
| 5,311,935 | A | * | 5/1994 | Yamamoto ......... B60H 1/00328 165/152 |
| 6,055,360 | A | * | 4/2000 | Inoue ..................... F24H 3/0435 165/151 |
| 7,098,426 | B2 | * | 8/2006 | Bohlender ............... H05B 3/14 219/202 |
| 2003/0132222 | A1 | * | 7/2003 | Bohlender ............... H05B 3/50 219/553 |
| 2004/0200829 | A1 | * | 10/2004 | Hamburger .............. H05B 3/06 219/548 |
| 2008/0128401 | A1 | * | 6/2008 | Bohlender ........... H05B 1/0236 219/202 |
| 2010/0187211 | A1 | * | 7/2010 | Eisenhour .......... B60H 1/00742 219/202 |
| 2020/0016956 | A1 | * | 1/2020 | Kwon ...................... H05B 3/42 |
| 2024/0011667 | A1 | * | 1/2024 | Niederer ................. H05B 3/06 |

OTHER PUBLICATIONS

Written Opinion of the International Search Administration Issued in Corresponding PCT Application No. PCT/EP2023/059719, dated Jul. 18, 2024 (4 Pages).

* cited by examiner

[Fig.1]
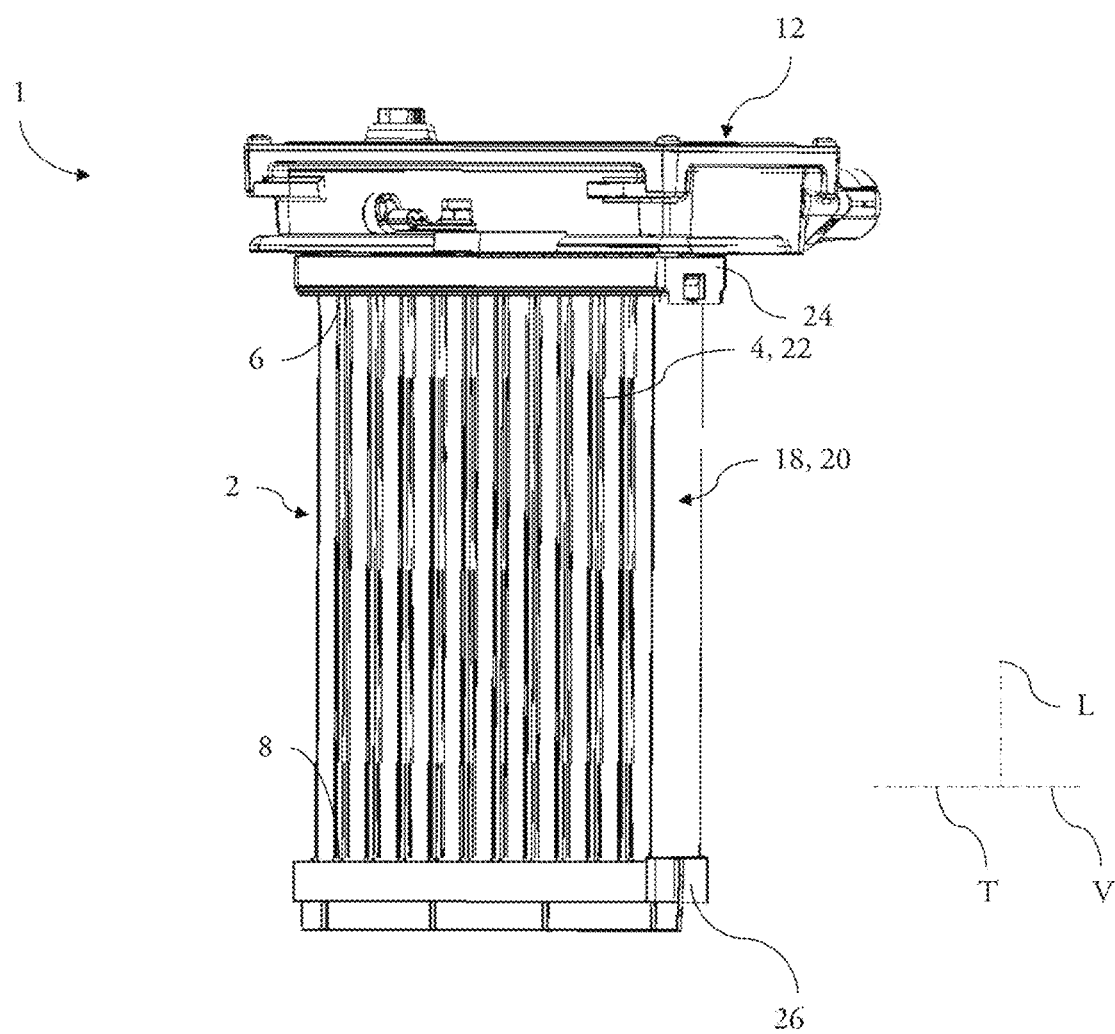

[Fig.2]
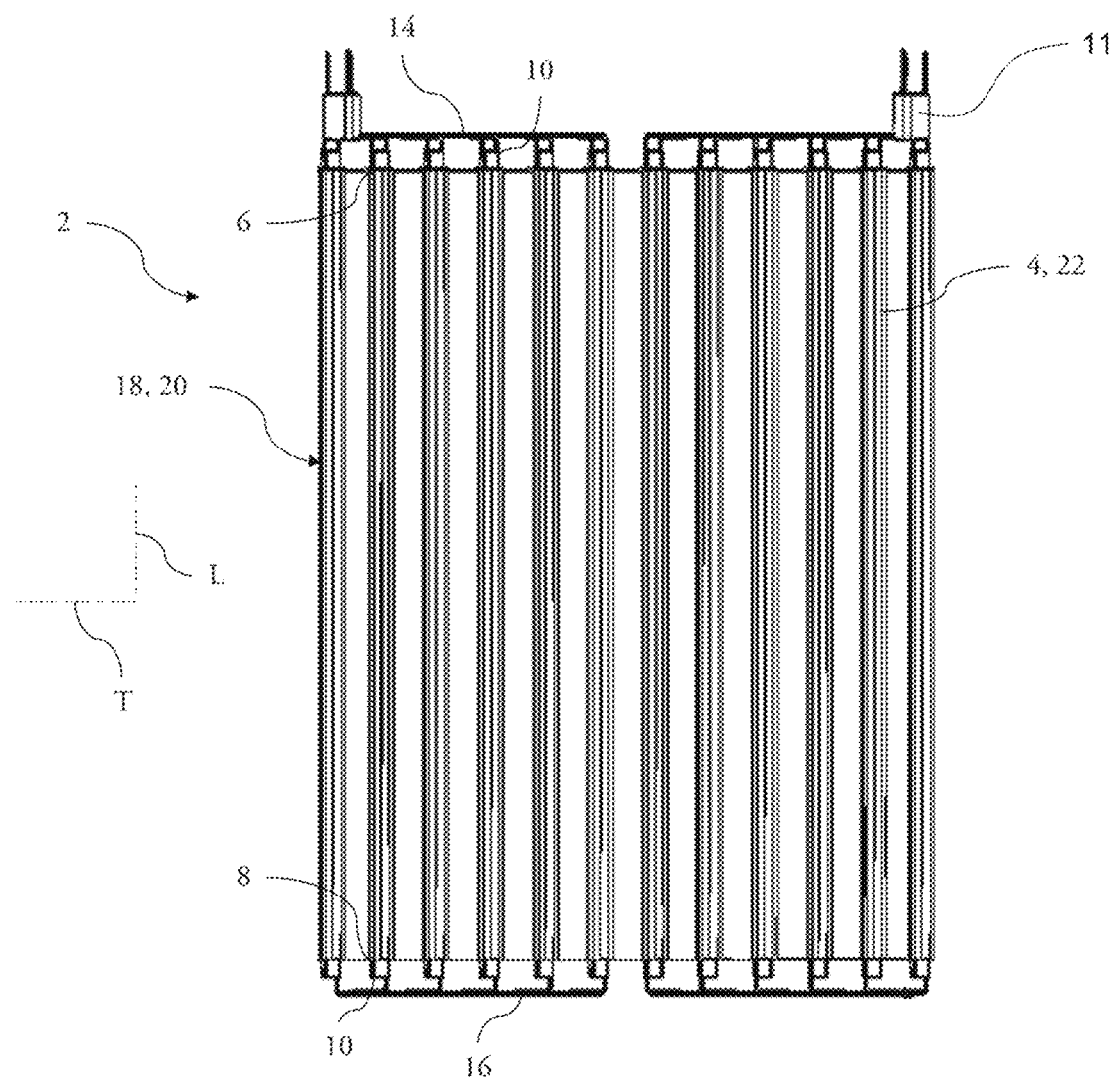

[Fig.3]
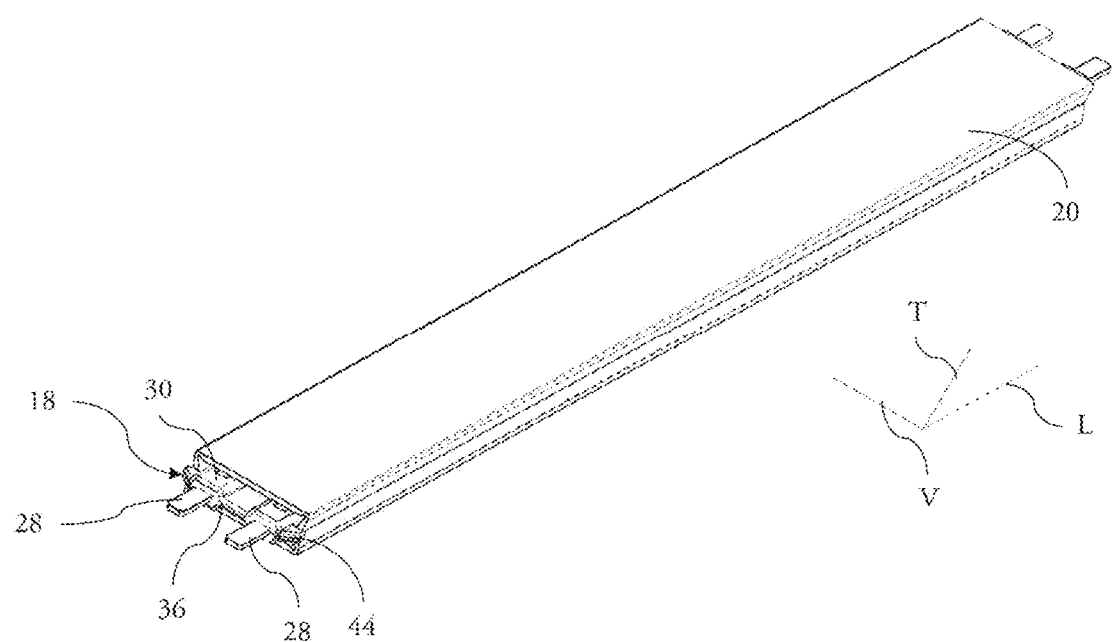

[Fig.4]
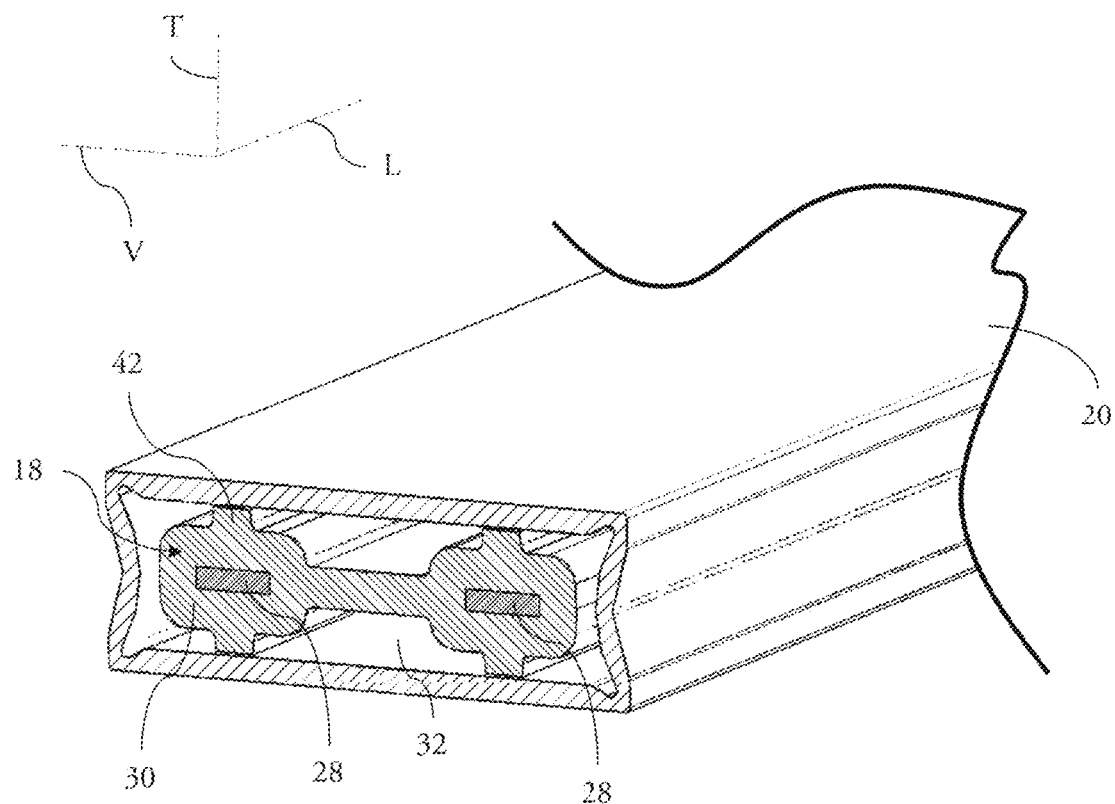

[Fig.5]
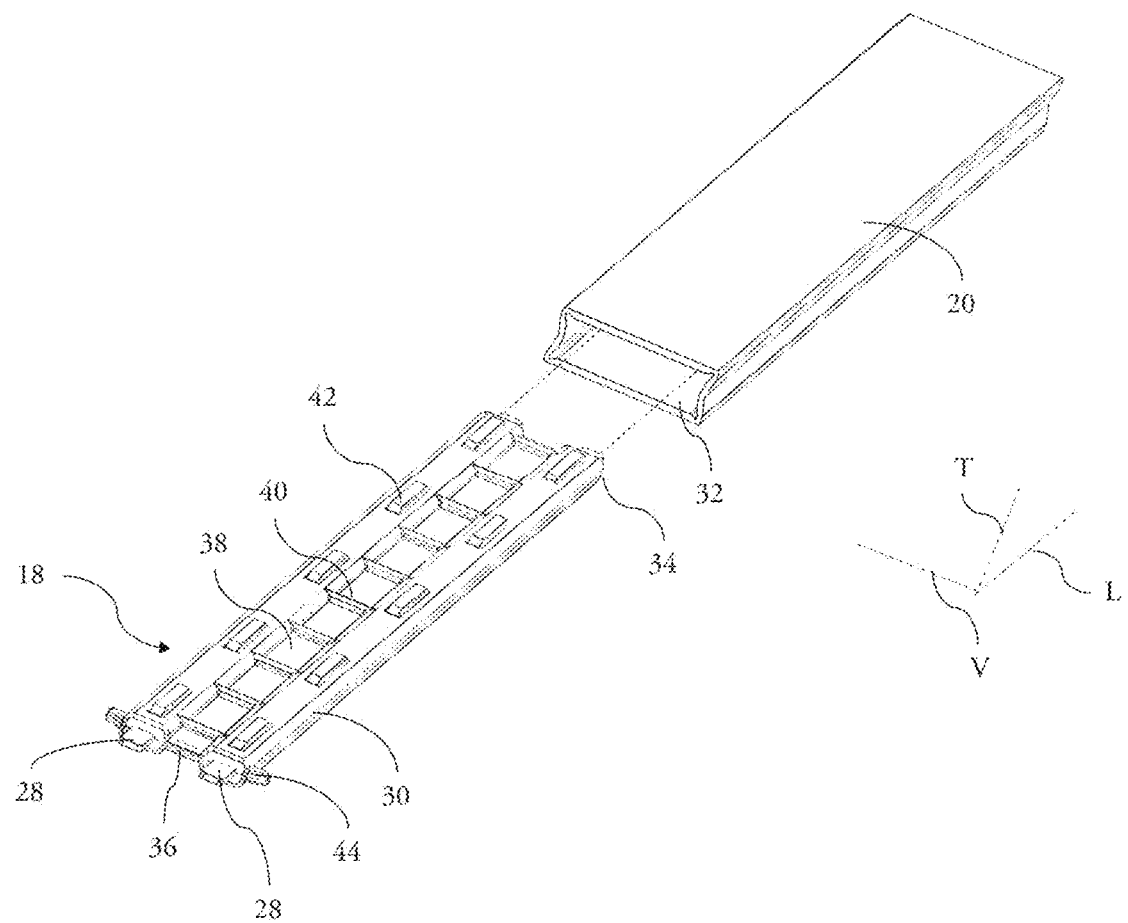

HEATING BODY OF AN ELECTRIC RADIATOR

The present invention pertains to the field of heating, ventilation and/or air-conditioning installations for motor vehicles, and it more specifically relates to an electric radiator for such heating, ventilation and/or air-conditioning installations.

Motor vehicles are generally equipped with a heating, ventilation and/or air-conditioning system that makes it possible to circulate an air flow toward the passenger compartment of the motor vehicle and, depending on the temperature of the passenger compartment desired by the driver and/or the passengers of the motor vehicle, to heat and/or cool the air flow sent to the passenger compartment. Such heating, ventilation and/or air-conditioning installations thus comprise at least one member for circulating the air flow and an electric radiator capable of heating the air flow circulated toward the passenger compartment.

It is known practice for the electric radiators of these heating, ventilation and/or air-conditioning installations to comprise a heating body in which heating elements, for example in the form of tubes, are arranged adjacent to one other across an air flow to be heated. Such electric radiators generally comprise at least one electronic control device intended to electronically control the heating elements and having a printed circuit board on which various electronic components are installed. The electronic components contribute to generating a control instruction to be transmitted to the heating elements so that they heat up. As a result, the temperature of the heating elements can increase and the air flow circulating between the heating elements of the electric radiator is heated as it circulates between the heating elements.

The heating elements are connected to the printed circuit board, where appropriate by transistors fastened to the printed circuit board, so that the control instructions can be transmitted to the heating elements.

By being fastened to the printed circuit board in this way, the heating elements mainly extend in a direction perpendicular to a plane of extension of the printed circuit board. In this arrangement, each heating element is connected to the printed circuit board at one of its longitudinal ends, namely the end closest to the printed circuit board, and all the resistive elements within the heating elements are supplied with the same electric current passing through this connection, so that a substantially uniform amount of heat is released over the entire main extension dimension of the heating element.

The intention may be to configure the heating body so as to be able to split it into a plurality of particular heating zones. In other words, the intention may be to supply electric current to the resistive elements present in a first zone of the heating body, in order to heat part of the air flow caused to pass through this heating body, and to simultaneously leave other resistive elements inactive so as to avoid expending electrical energy while the part of the air flow caused to encounter these other resistive elements does not need to be heated.

This requires an electrical connection at each of the longitudinal ends of the resistive elements, i.e. at the longitudinal end close to the printed circuit board and also at the opposite longitudinal end. In this configuration, the electrical connection between the opposite longitudinal end and the printed circuit board extends through the frame of the heating body. This solution is not satisfactory firstly because it exposes this electrical connection to the air flow circulating through the heating body and to potential humidification, which can lead to degradation of the electrical connection and, ultimately, to a break in the electrical connection between the printed circuit board and the opposite longitudinal ends of the resistive elements and secondly because it imposes a reduction in the effective heating surface.

The present invention proposes an alternative solution to the pre-existing solutions by targeting a heating body within which the arrangement of the electrical connection between the opposite longitudinal ends of the resistive elements and the printed circuit board is optimized in order to make the heating body itself more compact while at the same time optimizing the heating zone.

In this context, the main subject of the present invention is a heating body of an electric radiator, the heating body comprising a plurality of heating elements arranged adjacent to one another in a transverse direction of the heating body so as to delimit between them a space for circulating an air flow to be heated, the heating elements extending in a longitudinal direction perpendicular to the transverse direction and having a first longitudinal end and an opposite second longitudinal end, at least one of the heating elements having, at each of its longitudinal ends, at least one connecting member, the heating body comprising a first connecting device connected to at least one connecting member extending at the first longitudinal end of the at least one of the heating elements and a second connecting device connected to at least one connecting member extending at the second longitudinal end of the at least one of the heating elements, characterized in that an electrical connection member, which electrically connects the first connecting device to the second connecting device, is arranged in a connection tube, which extends parallel to the at least one of the heating elements.

The first connecting device and the second connecting device are in this case configured to be electrically connected to the respective connecting members extending at the longitudinal ends of the heating elements. It will be understood that the heating elements have connecting members at each of their longitudinal ends, and that the first connecting device is advantageously connected to the connecting members extending at the first longitudinal ends of the heating elements, while the second connecting device is connected to the connecting members extending at the second longitudinal ends of the heating elements.

The connection member is, for its part, electrically connected both to the first connecting device and to the second connecting device by extending through a connection tube that is configured to accommodate it. It is understood in this case that the connection member is protected by the connection tube from the external environment, thereby preventing degradation of said connection member by the external environment. For example, since the heating body is configured to heat an air flow circulating between the heating elements, moisture can be transported by the air flow and the connection tube in which the connection member extends in this case prevents degradation of said connection member.

The connection tube extends parallel to the heating elements so that it can be integrated into the heating element without disturbing the homogeneity of the air flow to be heated that is caused to pass through the heating body.

In addition, this particular arrangement of the connection member within a closed space such as the connection tube makes it possible to limit the bulk of the support of this connection member and thus to make the heating body more compact, with the aim of optimizing the ratio between the bulk of the radiator and the effective surface of the heating body.

According to various optional features of the invention, taken alone or in combination, it may be provided that:
- the connection tube and the heating elements are arranged adjacent to one another along the transverse direction;
- the heating elements are respectively housed in heating tubes;
- the connection tube is identical to at least one of the heating tubes;
- the connection tube and the heating tubes are installed equidistantly from one another.

According to the invention, such an arrangement in which similar tubes are distributed regularly, with one of these tubes that is used to house the connection member taking the place of a heating element, offers an excellent compromise between the heating efficiency of the radiator and the bulk, the air flow passing through the heating zone remaining homogeneous since the heating tubes and connection tubes are the same and equidistant, and the zone assigned to the electrical connection passing through the heating body being confined within a tube fitted to the connection member.

According to another optional feature of the invention, the heating body comprises at least a first cover, into which the first longitudinal ends of the heating elements and the first connecting device extend at least partially, and a second cover, which is distinct from the first cover and into which the second longitudinal ends of the heating elements and the second connecting device extend at least partially, the first cover and the second cover being arranged longitudinally on either side of the heating body. This removes the need to provide lateral walls forming a frame structure in order to protect the connection members and thus limits the transverse bulk since the connection tubes are fitted around the connection members.

According to another optional feature of the invention, the tube configured to house a connection member is arranged at one of the transverse ends of the heating body.

According to another optional feature of the invention, the heating body comprises two electrical connection members each installed in a connection tube, one of the connection tubes being arranged at one transverse end of the heating body, the other connection tube being arranged at the other transverse end of the heating body, the first cover, the second cover and the two connection tubes contributing to forming a frame of the heating body. In this arrangement, it may be noted that the connection tubes are arranged laterally so as not to form interruptions in the heating surface, i.e. zones without heating tubes.

According to another optional feature of the invention, the connection tube is surrounded transversely by two heating elements. This results in a central arrangement of the one or more connection members, it being understood that it may therefore be advantageous to provide a single connection tube in which two connection members, which are isolated from one another and respectively connected to a first connecting device specific to each connection member, are arranged.

According to another optional feature of the invention, the electrical connection member comprises two connection rods, each extending between the second connecting device and the first connecting device, and an insulating shell in which the connection rods extend, the insulating shell being arranged facing an inner face of the connection tube.

According to another optional feature of the invention, the insulating shell comprises a wall contributing to delimiting two housings, each of the rods respectively extending in a different housing, the wall extending mainly along the longitudinal direction and having a first longitudinal edge facing the electronic control unit and an opposite second longitudinal edge, the housings opening out at each of the longitudinal edges.

According to another optional feature of the invention, the insulating shell comprises at least one tab projecting from one of the longitudinal edges of the insulating shell along a direction perpendicular to the longitudinal direction, the tab being configured to form an end stop for insertion of the insulating shell into the connection tube.

According to another optional feature of the invention, the insulating shell comprises at least one lug projecting from one of the faces of the insulating shell and configured to be in contact with an inner face of the connection tube.

Another subject of the invention is an electric radiator comprising at least one heating body characterized according to any one of the preceding features and an electronic control unit that is housed in a casing and configured to supply power to and control the operation of the heating elements, the heating body being fastened to the casing, the casing comprising a bottom wall extending in a main plane of extension facing the heating body, the heating elements extending perpendicularly with respect to the main plane of extension of the bottom wall.

A final subject of the invention is a method of assembling a heating body characterized according to any one of the preceding features, the assembly method comprising a step of assembling the connection member in the connection tube, a step of assembling the heating elements and at least one step of assembling the heating body, during which the connecting members of the heating elements are electrically connected to either one of the connecting devices, the connection member being electrically connected to the second connecting device and to the first connecting device.

According to another optional feature of the invention, during the step of assembling the connection member in the connection tube, the rods are installed in the insulating shell, then the insulating shell is installed in the connection tube by being moved in translation along the longitudinal direction until the tab is in abutment against one of the longitudinal ends of the connection tube.

The connection tube can then be bent in order to fix the connection member in position within it.

Further features, details and advantages of the invention will become more clearly apparent from reading the following description on the one hand, and from a number of exemplary embodiments given by way of non-limiting indication, with reference to the appended schematic drawings on the other, in which:

FIG. 1 is a perspective depiction of an electric radiator according to one aspect of the invention, in particular showing a heating body;

FIG. 2 is a front-view depiction of the heating body depicted in FIG. 1, in which heating tubes and at least one connection tube are arranged;

FIG. 3 is a perspective depiction of a connection tube of the heating body depicted in FIG. 1 and of a connection member housed within the connection tube;

FIG. 4 is a cross section through the connection tube, more particularly showing an exemplary structure of the connection member from FIG. 3;

FIG. 5 is a perspective depiction of the arrangement of the connection tube and the connection member depicted in FIG. 3, in this case in an exploded view.

The features, variants and various embodiments of the invention may be combined with one another, in various combinations, as long as they are not mutually incompatible or mutually exclusive. It will be possible, in particular, to imagine variants of the invention that comprise only a selection of the features described below, in isolation from the other features described, if this selection of features is sufficient to confer a technical advantage and/or to distinguish the invention from the prior art.

In the figures, elements that are common to multiple figures retain the same reference sign.

In the following detailed description, the terms "longitudinal", "transverse" and "vertical" refer to the orientation of a heating body according to the invention. A longitudinal direction corresponds to a main direction of elongation of a tube of the heating body, this longitudinal direction being parallel to a longitudinal axis L of a coordinate system L, V, T illustrated in the figures. A transverse direction corresponds to a direction along which heating elements of the heating body are adjacently arranged, this transverse direction being parallel to a transverse axis T of the coordinate system L, V, T and this transverse axis T being perpendicular to the longitudinal axis L. Finally, a vertical direction corresponds to a direction parallel to a vertical axis V of the coordinate system L, V, T, this vertical axis V being perpendicular to the longitudinal axis L and to the transverse axis T.

FIG. 1 illustrates an electric radiator 1 comprising a heating body 2 according to the invention, the electric radiator 1 itself being configured to be installed in a heating, ventilation and/or air-conditioning installation. The electric radiator 1 is used in this type of installation for example to heat an air flow circulating in the heating, ventilation and/or air-conditioning installation through the heating body 2 of the electric radiator 1.

For this purpose, and as can be seen more particularly in FIGS. 1 and 2, the heating body 2 is equipped with heating elements 4 arranged adjacent to one another so as to delimit between them a space for circulating an air flow to be heated. More particularly, each heating element 4 is arranged at a distance from at least one adjacent heating element 4, a portion of the air flow being able to circulate between these two heating elements 4 in order to be heated up.

More particularly, the heating elements 4 are arranged parallel to one another in succession along a transverse direction T, each extending mainly along a longitudinal direction L perpendicular to the transverse direction T. The heating elements 4 each have a first longitudinal end 6 and an opposite second longitudinal end 8.

At least one of the heating elements 4 comprises a plurality of electrodes intended to supply electrical power to a resistive material in order to produce heat, these electrodes and the resistive material being housed in a heating tube 22. Each of the electrodes has a connecting member 10 and the electrodes are arranged within the heating tube 22 such that at least one connecting member 10 is arranged at each of the longitudinal ends of the heating elements 4. These connecting members 10 are in particular configured to be electrically connected to a printed circuit board of the electric radiator 1.

The electric radiator 1 comprises, as illustrated in FIG. 1, an electronic casing 12 that houses such a printed circuit board intended to generate and transmit control instructions to the heating elements 4 of the heating body 2, partly via the connecting members 10 of the electrodes. The electronic casing has at least one electrical connection terminal 11, which can be seen in FIG. 2 and which makes it possible to connect the printed circuit board to the connecting members in a sealed manner via a connecting device that is common to a plurality of connecting members. Such a connecting device makes it possible to transmit the same control instruction simultaneously to a plurality of connecting members, without it being necessary to connect the connecting members individually to the printed circuit board.

The heating body 2 comprises a first connecting device 14 connected to at least one connecting member 10 extending at the first longitudinal end 6 of one of the heating elements 4 and a second connecting device 16 connected to at least one connecting member 10 extending at the second longitudinal end 8 of one of the heating elements 4. More particularly, as illustrated in FIG. 2, the first connecting device 14 is electrically connected to a plurality of connecting members 10 extending at the first longitudinal ends 6 of a plurality of heating elements 4 and the second connecting device 16 is electrically connected to a plurality of connecting members 10 extending at the second longitudinal ends 8 of a plurality of heating elements 4.

According to the invention, the heating body 2 comprises an electrical connection member 18, which is arranged in a connection tube 20 and is configured and dimensioned to house this connection member 18, the electrical connection member 18 being arranged in the heating body in order to electrically connect the first connecting device 14 to the second connecting device 16. In other words, the connection member 18 is electrically connected both to the first connecting device 14 and to the second connecting device 16 by extending through a connection tube 20 that is configured to accommodate it. The connection member 18 is protected by the connection tube 20 from the external environment, thereby preventing degradation of said connection member 18 by the external environment.

In the example illustrated in FIG. 2, it will be noted that the heating body comprises two first connecting devices 14, which are respectively connected to a connection terminal 11, thereby making it possible to supply power to the heating elements connected to either one of the first connecting devices separately. Similarly, the heating body has two second connecting devices 16, which can be supplied with power separately by the printed circuit board via either one of the connection terminals 11, and a connection member 18 housed in a connection tube 20, so as to supply power to connecting members 10 at the second longitudinal end 8. The invention should be understood both as covering a heating body with a single first connecting device and a single second connecting device, and thus a single connection member housed in a connection tube, and as covering a heating body with two first connecting devices and two second connecting devices and, as mentioned, two connection members housed in the same connection tube or each in their own connection tube.

As can be seen in particular in FIG. 2, the connection tube 20 extends parallel to the heating elements 4, such that the connection tube 20 and the heating elements 4 are arranged adjacent to one another along the transverse direction T extending perpendicularly to the longitudinal direction L.

It should be noted that this stacking of the connection tube 20 and the heating elements 4 along the transverse direction T makes it easier to assemble the heating body 2 by bringing the ends of the connection tube 20 and of the heating elements 4 together at the same locations.

The connection tube 20 is inscribed in the regular transverse alignment of the heating tubes 22. Regardless of the position of the connection tube with respect to the heating tubes, all the tubes of the heating body are thus configured such that the connection tube 20 and the heating tubes are installed equidistantly from one another. In other words, a distance measured along a direction parallel to the transverse direction T between two adjacent tubes, whether these are connection tubes 20 and/or heating tubes 22, is similar to the distance between two other adjacent tubes along this same direction. This homogeneous distribution of the tubes of the heating body 2 makes it possible to generate regular passage sections in the heating body for the air flow and to avoid disturbing the circulation of this air flow through said heating body 2.

The connection tube 20 may be arranged transversely in several positions without departing from the context of the invention. As illustrated in FIG. 2, the connection tube 20 may in particular be arranged at one of the transverse ends of the heating body 2. Alternatively and not depicted here, the connection tube 20 can assume a more central position in the heating body, being surrounded transversely by two heating elements 4. It will be understood that, when positioned at a transverse end of the heating body, the connection tube 20 is offset in order to optimize the number of heating elements in the center of the heating body, while, when positioned substantially at the center of the heating body 2, the connection tube 20 may contribute to delimiting at least two transverse heating zones arranged on either side of said connection tube 20.

In one particular embodiment, illustrated in FIG. 2, the heating body 2 comprises two electrical connection members 18 that are each installed in a connection tube 20, as has just been described, one of the connection tubes 20 being arranged at one transverse end of the heating body 2 while the other connection tube 20 is arranged at the other transverse end of the heating body 2. It will be understood that in this particular embodiment, the connection tubes 20 are arranged at the transverse ends of the heating body 2 and thus contribute to transversely delimiting a heating zone through which the air flow circulates.

In this way, the arrangement of said tube and of the heating elements 4 optimizes the heating zone for the air flow through the heating body 2. This particular arrangement also makes it possible to make the heating body 2 more compact, with the aim of limiting the space taken up by the various components of the heating body 2 within the radiator.

The heating body 2 may comprise a first cover 24, into which the first longitudinal ends 6 of the heating elements and the first connecting device 14 extend at least partially, and a second cover 26, which is distinct from the first cover 24 and into which the second longitudinal ends 8 of the heating elements 4 and the second connecting device 16 extend at least partially. In this way, and as can be seen in FIG. 1, the first cover 24 and the second cover 26 are arranged longitudinally on either side of the heating body 2 and of the tubes 20, 22 contributing to defining this heating body. The covers 24, 26 are in this case members for covering each of the ends of the tube, configured to house either a connection member 18 or a heating element 4, and make it possible in particular to seal the ends of the connection tubes 20 or of the heating tubes 22 of the zone for circulating the air flow. It should be noted that a heating body 2 comprising another element instead of the covers 24, 26, such as walls for example, would not constitute a departure from the scope of the invention.

According to the example illustrated in FIG. 1, in which two connection tubes 20 are arranged at the transverse ends of the heating body, the first cover 24, the second cover 26 and the two connection tubes 20 contribute to forming a frame of the heating body 2, by longitudinally and transversely delimiting the heating zone through which an air flow circulates.

Regardless of the position of the connection tube 20 with respect to the heating tubes 22, it is advantageous according to the invention for the one or more connection tubes 20 to be identical to at least one of the heating tubes 22. Identical should be understood as meaning that the same tubes, having the same shape and the same dimensions, are used to house the connection members 18 and the heating elements 4. Using the same tubes makes it possible to be able to easily assemble and position the various tubes of the heating body 2 with respect to one another.

The connection member 18 and the connection tube 20 will now be described in more detail, with reference in particular to FIGS. 3 to 5.

The electrical connection member 18 comprises two connection rods 28, each extending between the second connecting device 16 and the first connecting device 14, and an insulating shell 30 in which the connection rods 28 extend, the insulating shell 30 being arranged around the connection rods in order to be interposed between these connection rods 28 and an inner face 32 of the connection tube 20.

The connection rods 28 extend parallel to one another and parallel to the longitudinal direction L when the electrical connection member 18 is arranged in the heating body. They each have a substantially rectangular cross section viewed in a plane perpendicular to the longitudinal direction L, as can be seen in FIG. 4.

Advantageously, the connection rods 28 comprise a metallic material that enables electrical conduction between the second connecting device 16 and the first connecting device 14, or, if necessary, directly between the second connecting device 16 and an electrical connection terminal 11, wherein this metallic material may in particular be chosen from among copper, a copper alloy or an iron-nickel alloy, in particular from among the following references: alloy 42, STOL 81, C1100, C2860.

The wall of the insulating shell 30 extends longitudinally between a first longitudinal edge 34 and an opposite second longitudinal edge 36, so as to almost entirely cover the connection rods 28, with the exception, at each longitudinal edge 34, 36, of tongues, which are used to connect the connection rods to a connecting device or to an electrical connection member.

The insulating shell 30 is configured to delimit two housings, each of the rods 28 respectively extending in one of the different housings. The housings both form a sealed zone for the corresponding rod 28 and are at a distance from one another, so as to avoid false contacts between the connection rods 28.

The insulating shell also has a central portion 38 extending between the two housings. This central portion 38 comprises bars 40 extending at regular intervals between the two housings in order to stiffen the insulating shell 30.

The housings open out at each of the longitudinal edges 34, 36, the connection rods 28 passing through orifices in the housing in which they respectively extend. The connection rods 28 are in contact with the wall at least at the first longitudinal edge 34 and at the second longitudinal edge 36. More precisely, the wall closely guides the connection rods 28 at the orifices communicating with the housings of the connection rods 28 so as to hold the connection rods 28 in position with respect to the insulating shell 30.

As can be seen more particularly in FIGS. 4 and 5, the insulating shell 30 comprises at least one lug 42 projecting from one of the faces of the insulating shell 30 and configured to be in contact with an inner face 32 of the connection tube 20. More particularly, the insulating shell 30 comprises a plurality of lugs 42 projecting from the wall in a direction perpendicular to the longitudinal direction. Each lug 42 has a bearing zone configured to be in contact with the inner face 32 of the connection tube 20. In this case, the function of the lugs 42 is to hold the insulating shell 30 in position in the connection tube 20 and to avoid any possible deformation of this connection tube 20.

In addition, the insulating shell 30 comprises at least one tab 44 projecting from the insulating shell 30 at one of the longitudinal edges, the tab 44 being configured to form an end stop for insertion of the insulating shell 30 into the connection tube 20. More particularly, the tab 44 has an abutment face intended to be in contact with one of the ends of the connection tube 20, as can be seen in FIG. 3. This tab 44 thus ensures the positioning of the insulating shell 30 with respect to the connection tube 20 along the longitudinal direction, when the connection member 18 is being assembled in the connection tube 20.

A method of assembling a heating body 2 according to the invention will now be described in more detail.

The assembly method comprises a step of assembling the connection member 18 in the connection tube 20, a step of assembling the heating elements 4 and at least one step of assembling the heating body 2, during which the connecting members 10 of the heating elements 4 are electrically connected to either one of the connecting devices, the connection member 18 itself being electrically connected to the second connecting device 16 and to the first connecting device 14.

More particularly, during the step of assembling the connection member 18 in the connection tube 20, the connection rods 18 are installed in the insulating shell 30, then the insulating shell 30 and the connection rods 18 are installed in the connection tube 20 by being moved in translation along the longitudinal direction L until the tab 44 is in abutment against one of the longitudinal ends of the connection tube 20.

During the step of assembling the heating elements 4, the electrodes and the resistive material, and for example PTC-effect stones, are assembled with respect to one another to form an assembly that is then installed in a heating tube 22. The heating elements 4 are installed so that at least one connecting member 10 of the electrodes is arranged at each of the longitudinal ends of the heating tube 22.

Once the step of assembling the connection member 18 in the connection tube 20 and the step of assembling the heating elements 4 in the heating tubes 22 have been carried out, the tubes 20, 22 are then arranged parallel to one another and electrically connected to the connecting devices.

As a reminder, the main subject of the invention is a heating body 2 of an electric radiator 1 comprising heating elements 4 extending along a main extension direction and having an electrical connecting member 10 at each of their ends, the heating body 2 comprising an electrical connection member 18 between connecting devices 14, 16 extending at each of the ends of the heating elements 4 for electrically connecting the electrical connecting members 10, and the heating body being more particularly characterized by the positioning of the connection member 18 in a tube arranged adjacent to other tubes themselves housing the heating elements. This arrangement of the connection member 18 in a tube in particular makes it possible to protect the connection member 18 from an air flow circulating through the heating body 2 between the heating elements 4 and can make it possible to standardize the means used to protect both the connection member on the one hand and the heating elements on the other hand.

The present invention is not however limited to the means and configurations described and illustrated in the present document, and also extends to all equivalent means and configurations and to any technically operational combination of such means.

The invention claimed is:

1. A heating body of an electric radiator, the heating body comprising:
    a plurality of heating elements arranged adjacent to one another in a transverse direction of the heating body so as to delimit between them a space for circulating an air flow to be heated,
    wherein the heating elements extending in a longitudinal direction perpendicular to the transverse direction and having a first longitudinal end and an opposite second longitudinal end,
    wherein at least one of the heating elements having, at each of its longitudinal ends, at least one connecting member;
    a first connecting device connected to at least one connecting member extending at the first longitudinal end of the at least one of the heating elements;
    a second connecting device connected to at least one connecting member extending at the second longitudinal end of the at least one of the heating elements,
    wherein an electrical connection member is arranged in a connection tube and is separate from and extends parallel to the at least one of the heating elements; and
    at least one electrical connection terminal to connect a printed circuit board to the at least one connecting member via one of the first or second connecting device which is common to the at least one connecting member.

2. The heating body as claimed in claim 1, wherein the connection tube and the heating elements are arranged adjacent to one another along the transverse direction.

3. The heating body as claimed in claim 1, wherein the heating elements are respectively housed in heating tubes.

4. The heating body as claimed in claim 3, wherein the connection tube is identical to at least one of the heating tubes.

5. The heating body as claimed in claim 4, wherein the connection tube and the heating tubes are installed equidistantly from one another.

6. The heating body as claimed in claim 1, comprising:
    at least a first cover, into which the first longitudinal ends of the heating elements and the first connecting device extend at least partially; and
    a second cover, which is distinct from the first cover and into which the second longitudinal ends of the heating elements and the second connecting device extend at least partially,
    wherein the first cover and the second cover being arranged longitudinally on either side of the heating body.

7. The heating body as claimed in claim 6,
    wherein the heating body further comprises a second electrical connection member installed in a second connection tube,
    wherein the electrical connection member is arranged at one transverse end of the heating body,
    wherein the second connection tube is arranged at the other transverse end of the heating body, the first cover, the second cover, and wherein the connection tube and the second connection tube form a frame of the heating body.

8. The heating body as claimed in claim 6, wherein the heating body further comprises:
two connection terminals; and
two second connecting devices which can be supplied with power separately by a printed circuit board via one of the two connection terminals,
wherein the electrical connection member is housed in the connection tube, so as to supply power to the at least one connecting member at the second longitudinal end.

9. The heating body as claimed in claim 1, wherein the connection tube is arranged at one of the transverse ends of the heating body.

10. The heating body as claimed in claim 1, wherein the connection tube is surrounded transversely by two heating elements.

11. The heating body as claimed in claim 1,
wherein the electrical connection member comprises:
two connection rods, each extending between the second connecting device and the first connecting device; and
an insulating shell in which the connection rods extend, wherein the insulating shell is arranged facing an inner face of the connection tube.

12. The heating body as claimed in claim 11,
wherein the insulating shell comprises a wall contributing to delimiting two housings,
wherein each of the rods respectively extending in a different housing,
wherein the wall extending mainly along the longitudinal direction and having a first longitudinal edge and an opposite second longitudinal edge,
wherein the housings opening out at each of the longitudinal edges.

13. The heating body as claimed in claim 12,
wherein the insulating shell comprises at least one tab projecting from one of the longitudinal edges of the insulating shell along a direction perpendicular to the longitudinal direction,
wherein the tab is configured to form an end stop for insertion of the insulating shell into the connection tube.

14. The heating body as claimed in claim 11, wherein the insulating shell comprises at least one lug projecting from one of the faces of the insulating shell and configured to be in contact with an inner face of the connection tube.

15. An electric radiator comprising:
at least one heating body as claimed in claim 1; and
an electronic control unit that is housed in a casing and configured to supply power to and control an operation of the heating elements,
wherein the heating body is fastened to the casing,
wherein the casing comprises a bottom wall extending in a main plane of extension facing the heating body,
wherein the heating elements extend perpendicularly with respect to the main plane of extension of the bottom wall.

16. A method of assembling a heating body as claimed in claim 1, the method comprising:
assembling the connection member in the connection tube;
assembling the heating elements; and
assembling the heating body,
wherein the connecting members of the heating elements are electrically connected to either one of the connecting devices.

17. The heating body as claimed in claim 1, wherein the at least one connecting member directly connects the second connecting device and the electrical connection terminal.

* * * * *